(12) United States Patent
Tella et al.

(10) Patent No.: US 7,433,585 B2
(45) Date of Patent: Oct. 7, 2008

(54) SYSTEM AND METHOD OF LENS PLACEMENT

(75) Inventors: Richard P. Tella, Sunnyvale, CA (US); William D. Fisher, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 421 days.

(21) Appl. No.: 11/273,990

(22) Filed: Nov. 15, 2005

(65) Prior Publication Data

US 2007/0110423 A1  May 17, 2007

(51) Int. Cl.
*G03B 3/00* (2006.01)
*G03B 17/00* (2006.01)

(52) U.S. Cl. ............ 396/89; 396/529; 359/819

(58) Field of Classification Search ............ 396/89, 396/103, 106, 529; 348/86, 87, 345, 374, 348/375; 359/811, 819, 822; 250/201.1, 250/201.2, 201.7
See application file for complete search history.

(56) References Cited

U.S. PATENT DOCUMENTS

| | | | | |
|---|---|---|---|---|
| 6,641,878 | B2 * | 11/2003 | Suzuki et al. | 428/35.7 |
| 7,233,737 | B2 * | 6/2007 | DeMonte | 396/89 |
| 7,274,356 | B2 * | 9/2007 | Ung et al. | 345/158 |
| 2004/0109080 | A1 * | 6/2004 | Chan et al. | 348/345 |
| 2006/0262429 | A1 * | 11/2006 | Manine | 359/822 |

* cited by examiner

*Primary Examiner*—W. B. Perkey
*Assistant Examiner*—Minh Phan
(74) *Attorney, Agent, or Firm*—RatnerPrestia

(57) ABSTRACT

A lens-placement system in accordance with the invention includes an imaging system having an imaging camera to capture an image of at least a portion of an image sensor module that is located in a fixed-focus camera. The captured image is used for placement of a lens in the fixed-focus camera.

18 Claims, 7 Drawing Sheets

SYSTEM AND METHOD OF LENS PLACEMENT

DESCRIPTION OF THE RELATED ART

A fixed-focus digital camera typically incorporates a lens placed in a lens mount at a fixed distance from an image sensor module that is used to convert incident light into a digital image. The placement of the lens in the lens mount is an important aspect of camera manufacture because the placement determines the effective focal range of the camera.

SUMMARY

A lens-placement system in accordance with the invention includes an imaging system having an imaging camera to capture an image of at least a portion of an image sensor module that is located in a fixed-focus camera. The captured image is used for placement of a lens in the fixed-focus camera.

BRIEF DESCRIPTION OF THE DRAWINGS

Many aspects of the invention can be better understood with reference to the following drawings. The components in the drawings are not necessarily to scale. Instead, emphasis is placed upon clearly illustrating the principles of the invention. Moreover, in the drawings, like reference numerals designate corresponding parts throughout the several views.

DETAILED DESCRIPTION

The various embodiments in accordance with the invention generally describe systems and methods of lens placement in a fixed-focus camera having an image sensor.

Figure 1:
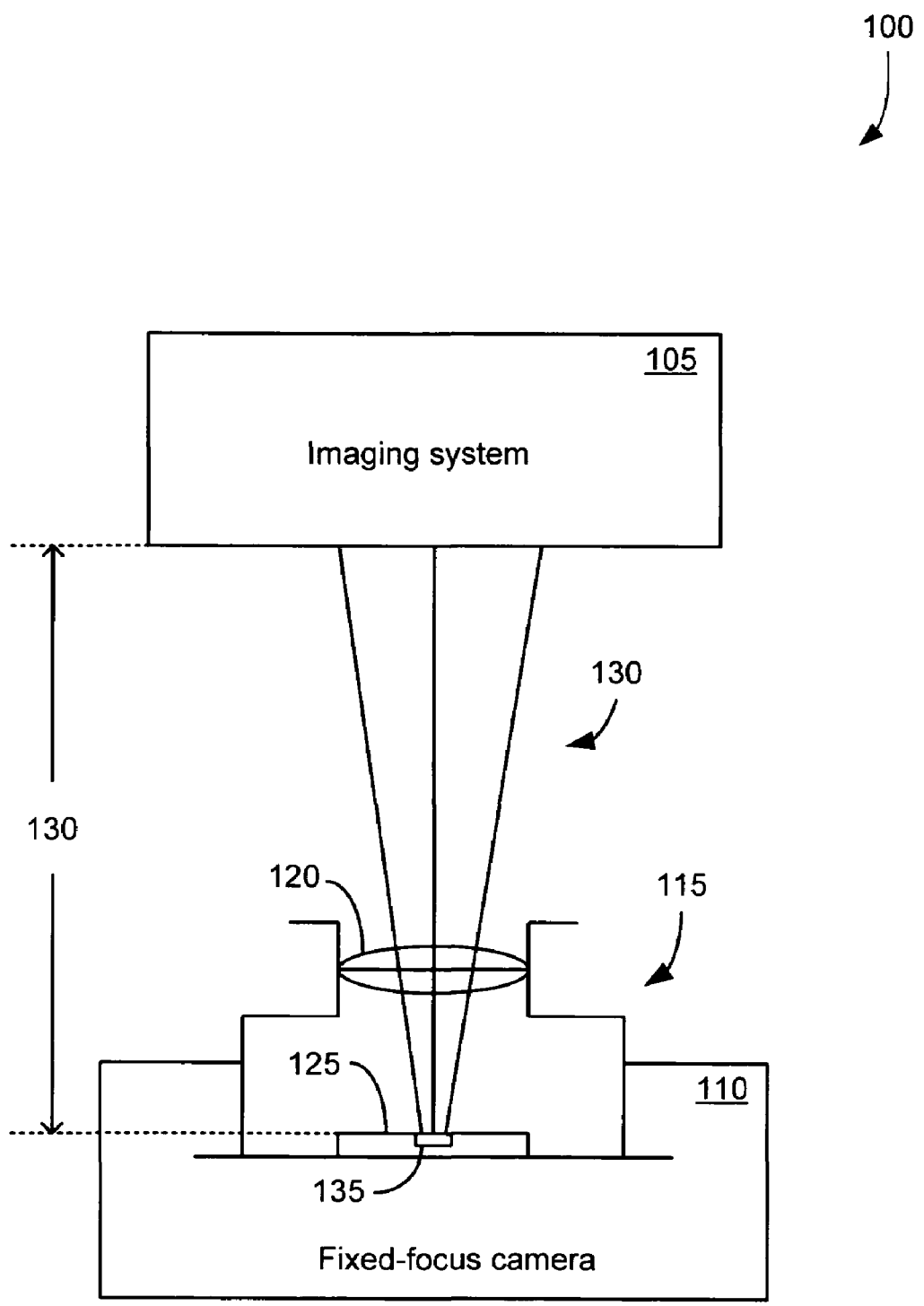
FIG. 1 shows a first exemplary embodiment of a lens-placement system in accordance with the invention.

FIG. 1 shows a first exemplary embodiment of a lens-placement system 100 in accordance with the invention. Lens-placement system 100 includes a fixed-focus camera 110 containing an image sensor module 125 and a lens-mount 115 housing a lens 120. Image sensor module 125 converts light received from an object through lens 120 into electrical signals that are used to generate a digital image of the object.

Lens-placement system 100 further includes an imaging system 105 that is located at a distance 130 from image sensor module 125. Distance 130 corresponds to an optimal focal length of imaging system 105 whereby an image of an object, such as image sensor module 125, can be captured by imaging system 105 with an acceptable degree of picture clarity. Focal distance 130 is independent of several specifications associated with fixed-focus camera 110. For example, focal distance 130 is independent of the resolution capacity or the field-of-view specifications of fixed-focus camera 110. Consequently, imaging system 105 can be used upon a variety of fixed-focus cameras incorporating various types and sizes of image sensors and lens.

Operation of lens-placement system 100 will now be described in further detail. In one exemplary embodiment, the first step of the operation involves placing fixed-focus camera 110 in a power-down state. The power-down state is generally defined as a state where fixed-focus camera 110 cannot be operated to capture an image of an object located external to fixed-focus camera 110.

The power-down state may be achieved by disconnecting, if any, all intrinsic and/or extrinsic power sources to fixed-focus camera 110. For example, this is carried out by removing a battery located inside fixed-focus camera 110, and/or by electrically uncoupling an external power supply of fixed-focus camera 110. The power-down state may also be achieved by disconnecting power provided to image sensor module 125, thereby preventing normal operation of image sensor module 125. In this power-down state, power may be provided to one or more elements of fixed-focus camera 110 other than image sensor module 125.

Once fixed-focus camera 110 is placed in the power-down state, imaging system 105 is activated to capture an image of at least a portion 135 of image sensor module 125. The surface of image sensor module 125 has certain optically-distinguishable characteristics such as surface texture, discontinuities, irregularities, 2-dimensional (2-D) features, and 3-dimensional (3-D) features. Such characteristics may be contributed in part by the pixelated opto-electronic sensors that are a part of image sensor module 125.

The image captured by imaging system 105 is evaluated, either manually or automatically, for image quality. Poor image quality is attributable in part, due to a sub-optimal placement of lens 120 with reference to image sensor module 125. If the image quality of the first captured image is not acceptable, lens 120 is placed in an alternative location in lens-mount 115 and a second image is captured using imaging system 105. The second captured image is then evaluated for image quality. If the image quality is still unacceptable, lens 120 is moved to yet another new location in lens-mount 115 and the image capture process is repeated until an acceptable level of image quality is obtained. Image quality is assessed using various standards, such as image focus, edge-characteristics, color characteristics, image brightness, image contrast, and image resolution at various points in the image. Such parameters are applied to an electronic image on a display screen of imaging system 105 and/or upon a hardcopy of the captured image.

Once an acceptable level of image quality is obtained, lens 120 is anchored to the optimal location in lens-mount 115. Such anchoring may be carried out by using a mechanical device such as a locking-ring and/or by using a suitable adhesive.

The procedure described above provides one exemplary method of operation for lens-placement system 100. It will be understood that several alternative methods may be employed. For example, in a first alternative embodiment, the power-down procedure described above will not be used. In this alternative embodiment, fixed-focus camera 110 contains one or more power sources that are operable to provide power to fixed-focus camera 110. Furthermore, fixed-focus camera 110 is in a power-up condition, when imaging system 105 is used to capture an image of image sensor module 125.

In a second alternative embodiment, irrespective of the power-up or power-down condition of fixed-focus camera 110, system 105 is used to capture one or more images of an object other than image sensor module 125. Such an object is located in the same plane as image sensor module 125. The captured image of the object provides image quality information that is used to suitably place lens 120 in an optimal location of lens-mount 115. Some examples of such an object are: a fiducial mark, a light-emitting element, a reflective element, a fluorescent element, a phosphorescent element, a protrusion having a uniquely-identifiable shape, and an indentation having a uniquely-identifiable shape.

Figure 2:
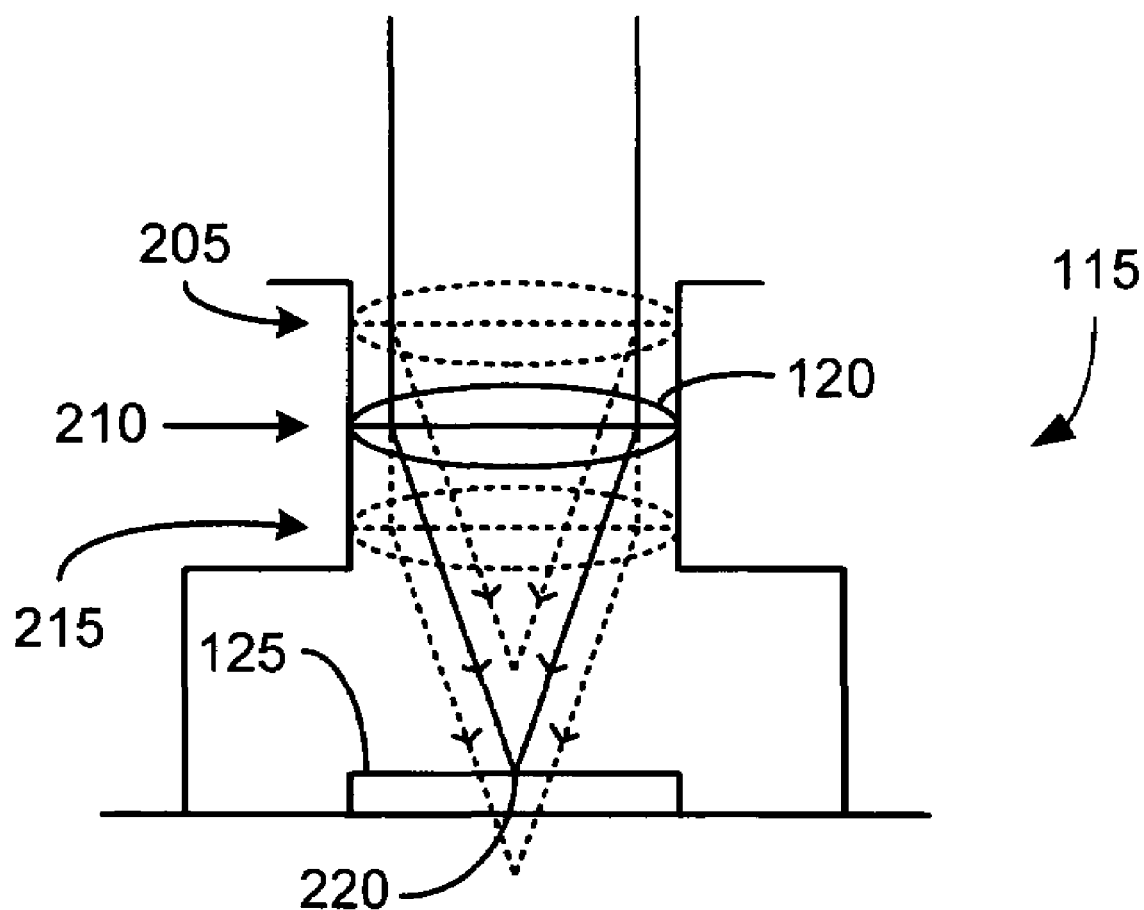
FIG. 2 shows a lens mount that provides alternative locations for placing a lens in accordance with the invention.

FIG. 2 shows lens mount 115 providing several alternative locations for placing lens 120 with respect to image sensor module 125. In the exemplary embodiment of FIG. 2, location 210 is termed an optimal location for lens 120 because image sensor module 125 then lies at a focal point 220 of lens 120. This location is identified using lens-placement system 100 as described above. On the other hand, locations 205 and 215 are sub-optimal positions because in either of these two positions, image sensor module 125 is located away from focal point 220.

Figure 3:
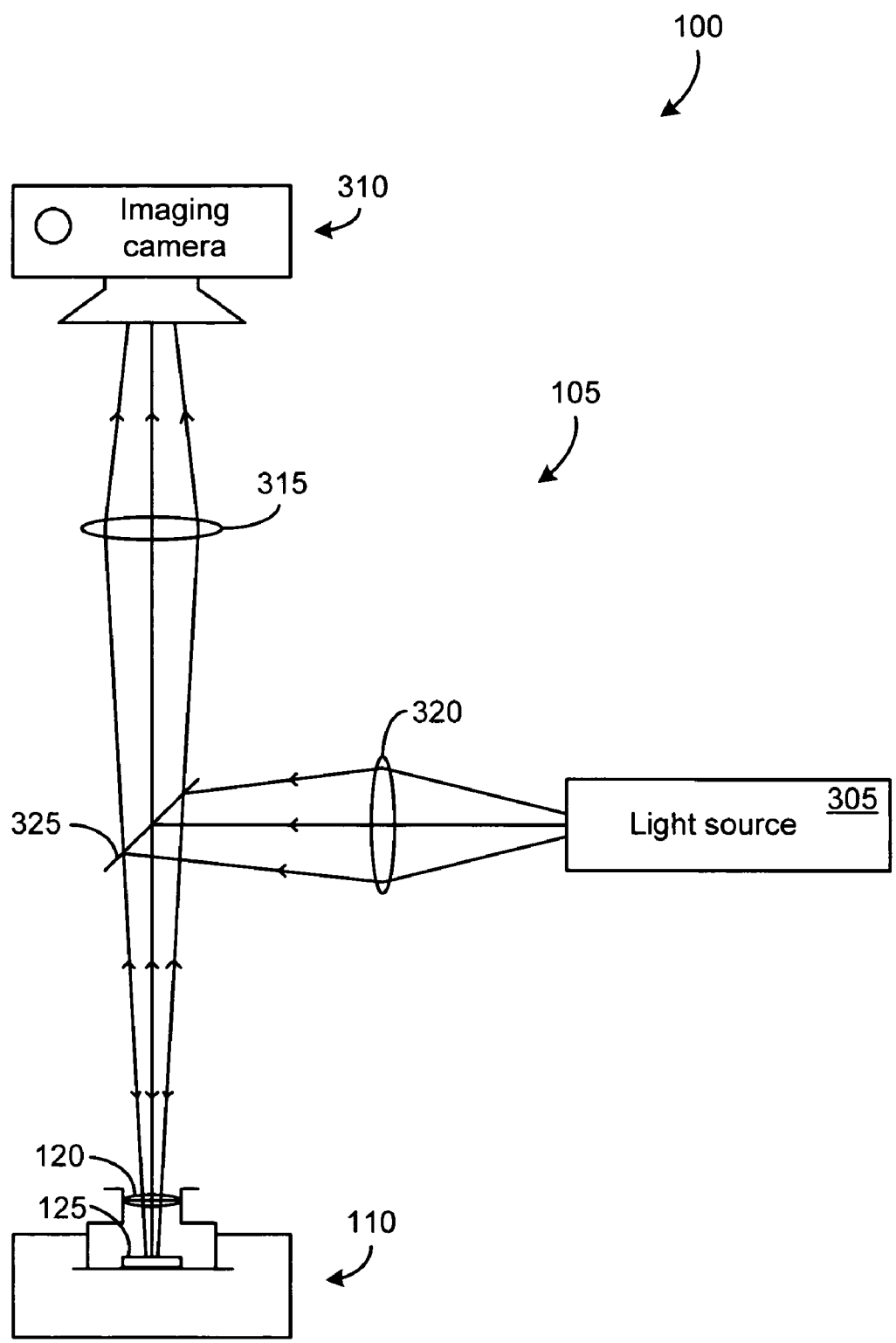
FIG. 3 shows an exemplary embodiment of an imaging system used in the lens-placement system of FIG. 1.

FIG. 3 shows an exemplary embodiment of imaging system 105 that is a part of lens-placement system 100. In this exemplary embodiment, imaging system 105 includes an imaging camera 310 that is used to capture an image of image sensor module 125. In a first embodiment, imaging camera 310 is a stand-alone digital camera that is operated manually. In a second embodiment, imaging camera 310 is part of an automated set-up, such as a computer system (not shown). In this second embodiment, imaging camera 310 is either built into the computer or is electrically coupled to the computer via a communication link (not shown).

Imaging system 105 further includes a light source 305. Light source 305 is used to illuminate image sensor module 125 for capturing an image of image sensor module 125 via imaging camera 310. Light generated by light source 305 is focused via light-focusing lens 320 on to light-directing element 325. In one exemplary embodiment, light-directing element 325 is a beam splitter that directs light received from light source 305 on to image sensor module 125 via lens 120. Image sensor module 125 reflects this light back towards light-directing element 325 via lens 120. The reflected light is propagated through light-directing element 325 towards imaging camera 310. Imaging lens 315 focuses the reflected light on to imaging camera 310.

The beam-splitter of this exemplary embodiment is formed of a directional mirror that reflects a first portion of light incident upon the mirror, while simultaneously allowing a second portion of the incident light to propagate through the mirror.

In other embodiments, light-directing element 325 may be formed of other optical elements such as a prism or a grating, and light source 305 generates a selected wavelength of light. In one such embodiment, the selected wavelength corresponds to a visible wavelength. In another such embodiment, the selected wavelength corresponds to an invisible wavelength such as an infra-red wavelength.

Figure 4:
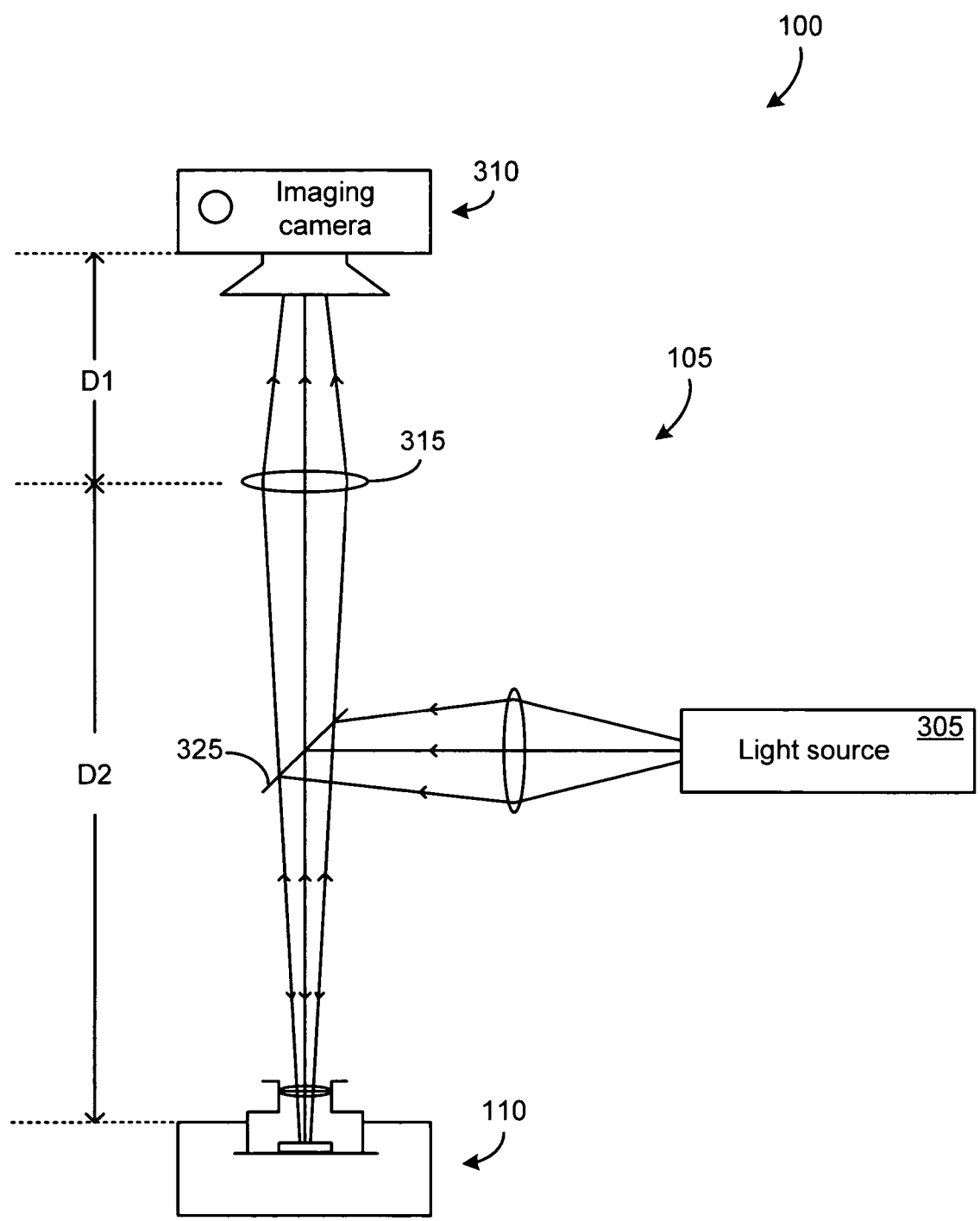
FIG. 4 shows further details of the imaging system of FIG. 3.

FIG. 4 provides placement details of certain elements of imaging system 105. Imaging camera 310 is located at a distance D1 from imaging lens 315. In an exemplary embodiment, D1 ranges from about 50 mm to about 270 mm. Fixed-focus camera 110 is located at a distance D2 from imaging lens 315. In an exemplary embodiment, D2 ranges from about 50 mm to about 70 mm. The values of D1 and D2 are selected based on various factors, such as the type of imaging camera 310 used, the focal length of imaging lens 315, and various parameters of fixed-focus camera 110 such as focal length and depth-of-field.

Figure 5:
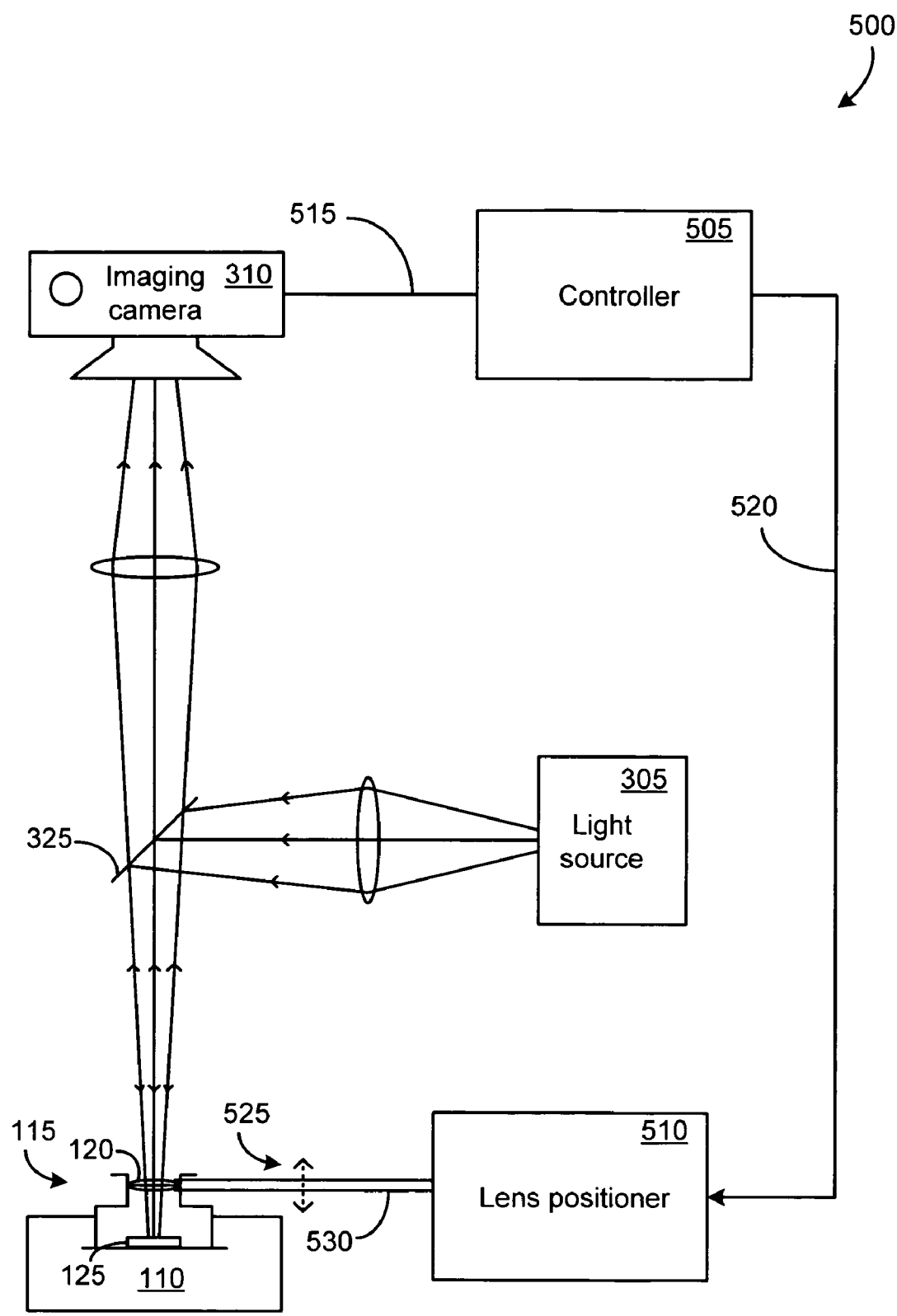
FIG. 5 shows an exemplary embodiment of an automated lens-placement system in accordance with the invention.

FIG. 5 shows an exemplary embodiment of an automated lens-placement system 500 in accordance with the invention. Automated lens-placement system 500 includes a controller 505 that is communicatively coupled to imaging camera 310 via communication link 515.

In a first exemplary embodiment, imaging camera 310 is a camera that provides a composite video output signal. The composite video output signal is carried over communications link 515, which uses one or more co-axial cables, to controller 505. Controller 505 contains a frame-grabber card that converts the composite video output signal into digital image data for further processing in controller 505.

In a second exemplary embodiment, controller 505 is a personal computer (PC) and communication link 515 is a Universal Serial Bus (USB) communication link. Digital image data directly provided by imaging camera 310 is coupled into controller 505 via communication link 515.

Controller 505 processes the digital image data to evaluate captured image parameters. If the captured image parameters are outside a pre-determined range of values, controller 505 issues a control signal that is transmitted through communication link 520 to lens positioner 510.

Lens positioner 510 is an industrial robot for example, and has a mechanical arm 530 that is mechanically coupled to lens 120 for placing lens 120 in one of several locations in lens mount 115. In one embodiment, mechanical arm 530 operates to place lens 120 in an optimal location in lens mount 110 and further operates to anchor lens 120 by activating a collar ring (not shown). In the embodiment illustrated by FIG. 5, lens positioner 510 is operated to move mechanical arm 530 bi-directionally as indicated by bi-directional arrow 525. In other embodiments, mechanical arm moves in various directions such as lateral, longitudinal, rotational and traverse directions.

Figure 6:
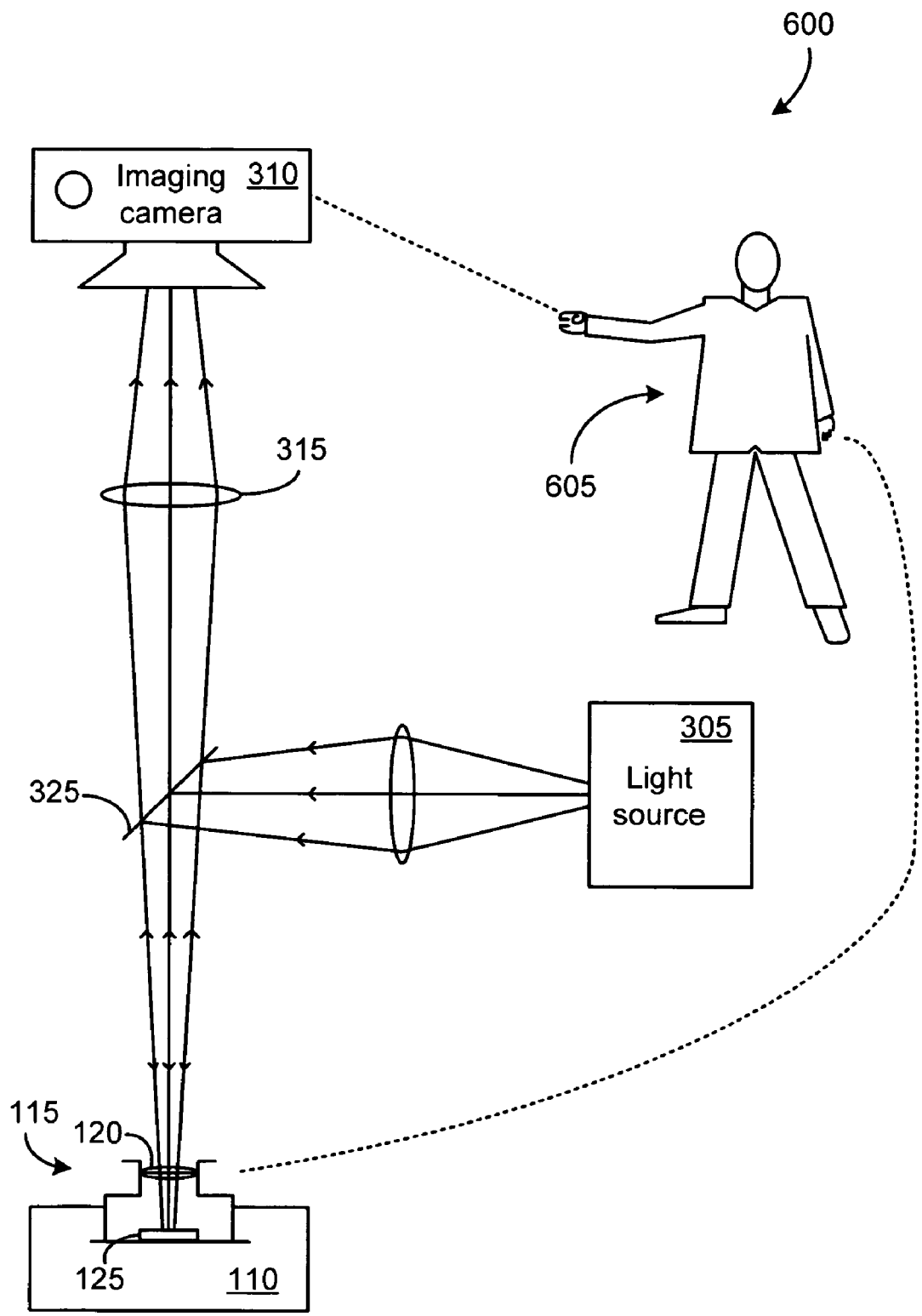
FIG. 6 shows an exemplary embodiment of a manual lens-placement system in accordance with the invention.

FIG. 6 shows an exemplary embodiment of a manually-operated lens-placement system 600 in accordance with the invention. Lens-placement system 600 includes a human operator 605 who operates imaging camera 310 to capture an image of image sensor module 125. Human operator 605 then evaluates the captured image, by looking at a display screen of imaging camera 310 for example. If the captured image proves unsatisfactory, human operator 605 manually re-positions lens 120 in lens-mount 115, and captures a second image using imaging camera 310. The process is repeated until lens 120 has been placed in an optimal location in lens-mount 115 when a satisfactory image has been captured.

In an alternative embodiment, image camera 310 is eliminated and human operator 605 looks directly at image sensor module 125 through imaging lens 315 and light-directing element 325. Human operator 605 manually adjusts the location of lens 120 in lens-mount 115 until image sensor module 125 is sharply focused upon the eye of human operator 605. In this alternative embodiment, imaging lens 315 incorporates optical characteristics that provide such a focus.

In yet another alternative embodiment, image camera 310 is replaced by a viewing screen. Human operator 605 observes an image of image sensor module 125 that is projected upon the viewing screen and manually adjusts the location of lens 120 in lens-mount 115 until image sensor module 125 appears visible in sharp focus upon the viewing screen. Imaging lens 315 incorporates optical characteristics that provide the sharp focus upon the viewing screen.

Each of the imaging lenses 315 selected for each of the embodiments described above, may differ from one another in their optical characteristics as well as their physical characteristics.

Figure 7:
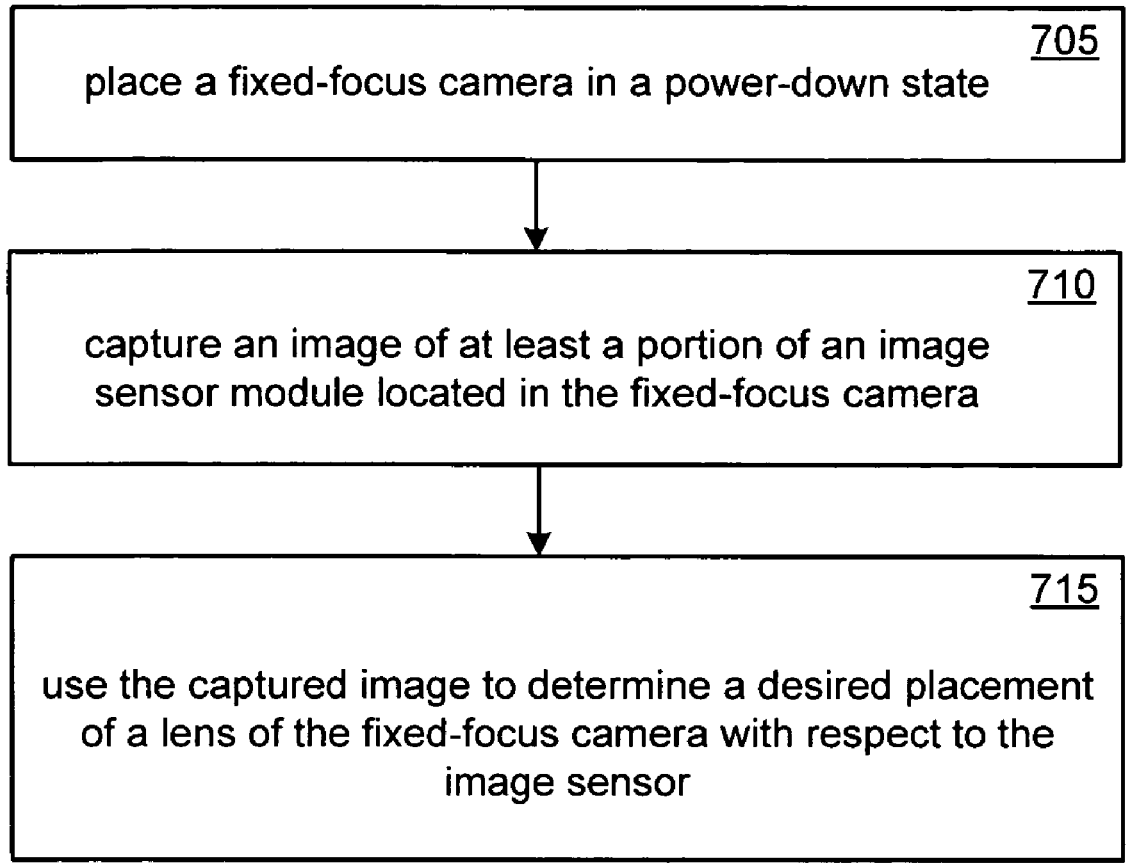
FIG. 7 shows a flowchart of an exemplary method of placement of a lens in a fixed-focus camera.

FIG. 7 shows a flowchart of an exemplary method of placement of a lens in a fixed-focus camera. In block 705, a fixed-focus camera is placed in a power-down state as described above. In block 710, an image of at least a portion of an image sensor module is captured. In one embodiment, an imaging camera is used to capture an image of a portion of the image sensor module surface, while in another embodiment; the imaging camera is used to capture an image of the entire surface of the image sensor module. Furthermore, various types of imaging cameras can be used for capturing the image. Some examples include: a digital still-camera, a conventional still-camera that uses a roll of film, a digital video-camera, and an analog video-camera. Consequently, the image is captured on various imaging media, such as, a display screen, a hardcopy, a roll of film, and a video tape.

In block 715, the captured image is evaluated to determine a desired placement of one or more lens in the fixed-focus camera. Typically, the placement involves placing one or more lens of a lens system in a suitable location in a lens-mount such that the image sensor module is located at the focus of the lens system. The lens-placement allows the fixed-focus camera to be subsequently used for capturing images with an acceptable level of picture quality.

Evaluation of the captured image in block 715 includes evaluating various image parameters such as image contrast and sharpness. For example, image contrast over the entire image or over portions of the captured image is used to evaluate image quality. This is carried out for example, by measuring the difference in peak amplitudes between dark areas and bright areas of an object contained in the captured image.

The above-described embodiments are merely set forth for a clear understanding of the principles of the disclosure. Many variations and modifications may be made without departing substantially from the disclosure. All such modifications and variations are included herein within the scope of this disclosure.

We claim:

1. A lens-placement system comprising:
    a fixed-focus camera comprising an image sensor module and a lens; and
    an imaging system comprising an imaging camera configured to capture an image of at least a portion of the image sensor module, wherein the captured image is used for adjusting a focusing distance between the image sensor and the lens in the fixed-focus camera, and
    the captured image is an image of a surface of the image sensor module, the image of the surface configured for viewing when the fixed-focus camera is in a power-down state.

2. The lens-placement system of claim 1, further comprising:
    a light source configured to direct light upon the image sensor module.

3. The lens-placement system of claim 2, further comprising:
    a light directing element configured to receive light from the light source and direct the received light upon the image sensor module; and
    wherein the light directing element is further configured to receive light reflected by the image sensor module and to propagate the reflected light towards the imaging camera.

4. The lens-placement system of claim 3, further comprising:
    a light focusing lens for focusing light received from the light source upon the light directing element; and
    an imaging lens for focusing light reflected by the image sensor module upon the imaging camera.

5. The lens-placement system of claim 4, wherein the imaging camera is located at a first distance from the imaging lens, the first distance ranging from about 50 mm to about 270 mm; and the fixed-focus camera is located at a second distance from the imaging lens, the second distance ranging from about 50 mm to about 70 mm.

6. The lens-placement system of claim 5, wherein the imaging lens has a focal length ranging from about 100 mm to about 300 mm.

7. The lens-placement system of claim 1, wherein the lens is one of a glass lens and a plastic lens.

8. The lens-placement system of claim 1, further comprising:
    a lens-mount that is a part of the fixed-focus camera, the lens-mount configured to provide a plurality of locations for placement of the lens.

9. The lens-placement system of claim 8, wherein the imaging system further comprises:
    a controller configured to process the captured image and generate a control signal in response to at least one parameter of the captured image; and
    a lens positioner configured to receive the control signal and place the lens at one of the plurality of locations in response to the control signal.

10. The lens-placement system of claim 9, wherein the at least one parameter of the captured image is the image sharpness.

11. A method of placement of a lens in a fixed-focus camera, the method comprising:
    providing an imaging camera;
    operating the imaging camera to capture an image of at least a portion of an image sensor module located in the fixed-focus camera; and
    using the captured image to determine a desired placement of the lens with respect to the image sensor module;
    wherein the captured image is an image of a surface of the image sensor module, the image of the surface configured for viewing when the fixed-focus camera is in a power-down state.

12. The method of claim 11, further comprising:
    providing a light source;
    directing light from the light source upon the image sensor module; and
    directing reflected light from the image sensor module towards the imaging camera.

13. The method of claim 11, wherein the step of operating the imaging camera to capture the image and the step of using the captured image to determine the desired placement of the lens are each implemented by a human operator.

14. The method of claim 11, wherein the step of operating the imaging camera to capture the image and the step of using the captured image to determine the desired placement of the lens are each implemented automatically.

15. A method of placement of a lens in a fixed-focus camera, the method comprising:
    placing the fixed-focus camera in a power-down state;
    capturing an image of at least a portion of an image sensor module located in the fixed-focus camera; and
    using the captured image to determine a desired placement of the lens with respect to the image sensor module.

16. The method of claim 15, wherein the step of capturing an image comprises using an imaging camera.

17. The method of claim 15, wherein the step of using the captured image comprises:
  setting a standard for an image parameter;
  evaluating the captured image to determine if the image parameter of the captured image meets the standard;
  determining, when the image parameter of the captured image meets the standard, that a current placement of the lens is the desired placement; and
  determining, when the image parameter of the captured image does not meet the standard, a new placement of the lens that is the desired placement.

18. The lens-placement system of claim 17, wherein the image parameter is image sharpness.

* * * * *